Nov. 22, 1966
C. R. JOHNSON
3,286,356
GRADE MEASURING DEVICE
Filed Nov. 21, 1963
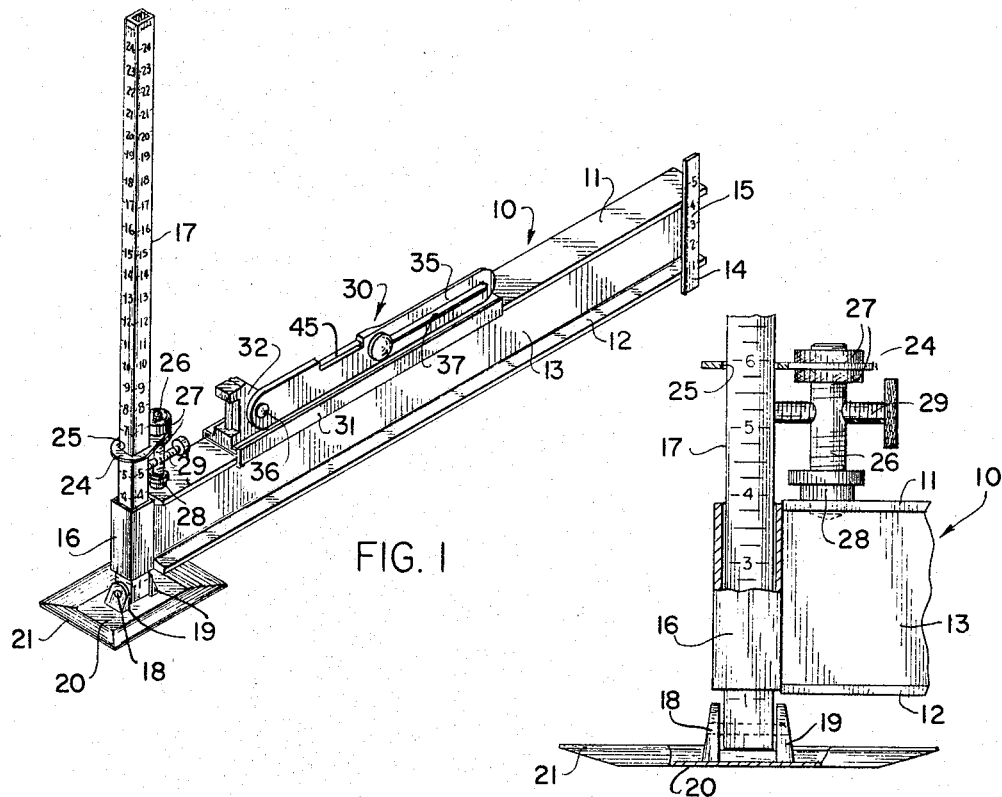
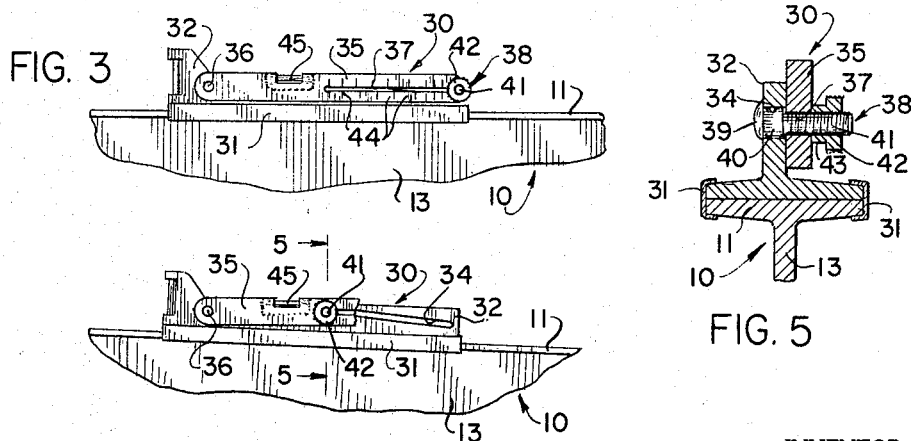
INVENTOR
CARL R. JOHNSON
BY
ATTORNEY

United States Patent Office 3,286,356
Patented Nov. 22, 1966

3,286,356
GRADE MEASURING DEVICE
Carl R. Johnson, 19 Northbrook Drive,
Mount Vernon, Ill.
Filed Nov. 21, 1963, Ser. No. 325,328
2 Claims. (Cl. 33—214)

This invention relates to landscaping during building construction or the like and to the disposal of waste material as well as to apparatus utilized in the grading of earth or other material.

The invention relates particularly to apparatus for measuring deviation from a desired grade of the surface of the earth or for measuring the pitch of conduits or the like placed on sub-grades.

Heretofore, numerous devices have been provided for measuring the grade and sub-grade of earth or other material as well as devices for measuring the amount of deviation from a desired grade and utilized by building inspectors or the like; however, these prior devices have not been entirely satisfactory since they have been bulky, difficult to handle, were composed of many movable parts which were complicated and easy to get out of adjustment, and for other reasons were not sufficiently accurate to be reliable.

It is an object of the invention to overcome the deficiencies enumerated and to provide a simple, inexpensive device for measuring a desired grade or deviations from a desired grade and having a scale with indicia thereon so that a direct reading may be observed.

Another object of the invention is to provide a lightweight, durable, portable device for measuring deviation from a desired grade which is easily adjustable to a desired angle.

Other objects and advantages of the invention will be apparent from the following description taken in conjunction with the accompanying drawing in which:

FIG. 1 is a perspective illustrating one application of the invention;

FIG. 2, an enlarged fragmentary side elevation of one end of the device illustrating the adjustability of the indicator and scale.

FIG. 3, an enlarged fragmentary side elevation of the leveling means in one position;

FIG. 4, a view similar to FIG. 3 illustrating the leveling device in another position; and, FIG. 5, an enlarged vertical section taken along the line 5—5 of FIG. 4.

Briefly stated, the present invention is a device for measuring deviation from a desired grade and includes a body or straight-edge on which an adjustable level is mounted and such body has a sleeve at one end which slidably receives a scale and permits such scale to follow the contour of the grade or other object so that a direct reading of the amount of variation is observed.

With continued reference to the drawing, a body 10 is provided constructed of lightweight channel, I-beam, or other structural shape. In the illustrated device, an I-beam is used having upper and lower flanges 11 and 12 connected by a central web portion 13. A foot 14 having indicia 15 thereon is mounted on one end of the body and extends below said body a predetermined distance. A generally square sleeve 16 is mounted on the opposite end of the body 10 and such sleeve slidably receives a generally square scale 17 which may be hollow if desired. The lower end of the scale or measuring stick is connected by a pivot 18 to a pair of lugs 19 carried by a shoe 20 so that such shoe will remain substantially flat on the grade regardless of the angularity of such grade. The shoe 20 preferably has turned up edges 21 to facilitate sliding movement of the shoe over the earth or other material being inspected. In the uppermost position of the measuring stick, the bottom of the shoe 20 is substantially even with the bottom of the foot 14 when the body 10 is level.

In order to measure the movement of the scale 17, an indicator plate 24 is provided having an opening 25 in vertical alignment with the sleeve 16 and in which the scale 17 is received. The indicator plate is adjustably mounted on a stud 26 by means of a pair of knurled nuts 27 to permit vertical adjustment of the plate. The stud 26 is threadedly mounted on the body 10 and is secured in position by a lock nut 28. A set screw 29 is carried by the stud 26 and is adapted to engage one side of the scale to prevent movement of such scale when not in use.

An adjustable level 30 is mounted on the upper flange 11 of the body by means of a pair of clamps 31 and such level includes a fixed member 32 having an elongated slot 34. An adjustable member 35 is pivotally mounted on the fixed member 32 by a pin 36 and such adjustable member has an elongated slot 37. The elongated slot 34 is disposed at a slight angle to the horizontal and receives a bolt 38 having a head 39 disposed against one side of the fixed member 32, a square shank 40 slidably mounted in the slot 34 and a reduced threaded portion 41 slidably mounted in the slot 37 of the adjustable member 35. A knurled nut 42 having a shoulder 43 threadedly engages the reduced portion 41 so that when the nut is tightened the shoulder 43 will bear against the adjustable member 35 and bind such member to the fixed member 32 in fixed position. The adjustable member 35 has indicia 44 thereon which is calibrated to indicate the amount of pitch between the adjustable member and the body 10. A level indicator 45 of the bubble or other type is carried by the adjustable member 35.

In the operation of the device, the adjustable level 30 is set to the desired pitch of the grade by sliding the bolt 38 along the slots 34 and 37 and thereafter tightening the nut 42 to bind the adjustable member 35 to the fixed member 32. The foot 14 is placed in engagement with the material of the grade and the body 10 is swung vertically about the foot 14 in the direction toward the scale 17 until the indicator 45 is level after which the set screw 29 is operated to release the scale 17. In this position the shoe 20 and scale 17 fall by gravity until the shoe engages the material of the grade. Then the indicator plate 24 is adjusted either up or down to the nearest increment of measurement to provide a suitable reference point for directly reading the deviation from the desired grade. Thereafter, the body 10 is moved along the grade with the bottom of the foot 14 and the bottom of the shoe 20 in engagement therewith while the indicator 45 is maintained level. As the device is moved lengthwise along the grade the scale 17 is free to move up and down through the sleeve 16 as it follows the contour of the grade. Any deviation, either up or down, from the desired grade will be readable directly on the scale.

It will be apparent that a simple, compact, lightweight grade deviation measuring device has been provided which is easily adjustable to a desired angle and which will indicate whether the pitch of the grade is high or low and by how much.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. A grade deviation measuring device comprising an elongated body, said body having a top and a bottom surface, a sleeve mounted on one end of said body said sleeve having a longitudinal axis generally perpendicular to the plane of said top surface, a scale slidably carried by said sleeve and being freely movable therethrough, a shoe pivotally attached to the lower end of said scale and adapted to engage the material of the grade, an indicator plate adjustably mounted on said body adjustable in the direction of said sleeve axis, and having a portion disposed about said scale, means for securing said indicator plate in fixed adjusted position, an adjustable level mounted on said body and including a fixed member and an adjustable member, means for pivoting said adjustable member relative to said fixed member in a plane perpendicular to said top surface and extending lengthwise of said top surface and for fixing said adjustable member in adjusted position, and a level indicator carried by said adjustable member, said adjustable level enabling the angle of inclination of said body member to be determined and said scale member measuring deviations of the material of the grade from said angle of inclination.

2. A grade deviation measuring device comprising an elongated body, said body having a top and a bottom surface, a sleeve mounted on one end of said body said sleeve having a longitudinal axis generally perpendicular to the plane of said top surface, scale means having measuring indicia thereon slidably carried by said sleeve and being freely movable therethrough, a shoe pivotally attached to the lower end of said scale means and adapted to engage the material of the grade, an indicator mounted on said body and having a portion located adjacent to the indicia of said scale means, means for adjusting said indicator relative to said body in the direction of said sleeve axis so that the portion adjacent to said scale means will provide a directly readable reference point when said scale means moves, means for securing said indicator in fixed adjusted position, an adjustable level mounted on said body intermediate the ends thereof, said level including an adjustable member pivotally mounted on said body, means for pivoting said adjustable member relative to said body in a plane perpendicular to said top surface and extending lengthwise of said body and for fixing said member in adjusted position, and a level indicator carried by said adjustable member, whereby the angle between said body and said member can be adjusted and when said device is moved over a graded surface with the level indicator in level position, any deviation from the adjusted angle will be measured by said scale means.

References Cited by the Examiner

UNITED STATES PATENTS

| | | | |
|---|---|---|---|
| 811,739 | 2/1906 | Pelfrey et al. | 33—207 |
| 935,038 | 9/1909 | Lynch | 33—145 |
| 1,076,797 | 10/1913 | Sutton | 33—145 |
| 1,278,148 | 9/1918 | Heusser | 33—214 |
| 2,521,525 | 9/1950 | Krausser | 33—214 |
| 2,746,164 | 5/1956 | Eitzen | 33—214 |

LEONARD FORMAN, *Primary Examiner.*

L. ANDERSON, *Assistant Examiner.*